United States Patent [19]

Stephens

[11] Patent Number: 5,235,468
[45] Date of Patent: Aug. 10, 1993

[54] TRAILER HITCH VIEWING DEVICE WITH A READILY DETACHABLE FIXED ALIGNMENT, STORABLE MIRROR

[76] Inventor: Jon T. Stephens, 1406 Stove Prairie Rd., Bellvue, Colo. 80512

[21] Appl. No.: 847,602

[22] Filed: Feb. 13, 1992

[51] Int. Cl.$^5$ .............................................. G02B 7/18
[52] U.S. Cl. ................................... 359/841; 359/844
[58] Field of Search .............. 359/841, 844, 862, 863, 359/865, 871, 872; 248/474, 476, 486

[56] References Cited

U.S. PATENT DOCUMENTS

| | | | |
|---|---|---|---|
| 3,332,731 | 7/1967 | Penk | 359/872 |
| 3,524,701 | 8/1970 | Strohmeier | 248/476 |
| 4,163,606 | 8/1979 | Granno | 248/478 |
| 4,925,287 | 5/1990 | Lord et al. | 395/863 |
| 4,951,913 | 8/1990 | Quesada | 359/844 |

*Primary Examiner*—Bruce Y. Arnold
*Assistant Examiner*—J. P. Ryan
*Attorney, Agent, or Firm*—William E. Hein

[57] ABSTRACT

This invention is a trailer hitch viewing device which attaches to the front of a trailer and assists the driver of the tow vehicle to connect a trailer to a tow vehicle. The device is designed so that, after initial installation and alignment of the mirror, the mirror can be easily detached by merely lifting it out of an anchor bracket. The mirror is designed to be removed after the trailer hook up has been successfully achieved and to be folded in the center to form its own protective storage and carrying case. After storage, the mirror can be replaced for subsequent use by merely lowering it into the anchor bracket. Because of the unique design of the anchor bracket, mirror and other mounting hardware, the mirror does not require realignment when replaced and the device is immediately ready for use as soon as the mirror is placed in the anchor bracket. This device is particularly applicable to horse and cattle trailers or other trailers which have a vertical bulkhead behind the trailer hitch receiver for attachment of the anchor bracket. Furthermore, the design of the mirror and mounting hardware is such that the mirror can also be used as a convenient auxiliary mirror in other locations when not in use for assisting the hook up of the trailer.

5 Claims, 2 Drawing Sheets

TRAILER HITCH VIEWING DEVICE WITH A READILY DETACHABLE FIXED ALIGNMENT, STORABLE MIRROR

BACKGROUND AND SUMMARY OF THE INVENTION

In order to connect a trailer with a hitch receiver to a tow vehicle with hitch ball, it is necessary to closely align the hitch receiver on the trailer with the hitch ball on the rear of the tow vehicle. This is generally accomplished by either (1) having a second person guide the driver of the tow vehicle so as to align the hitch components, or (2) trial and error on the part of the driver of the tow vehicle which requires that the driver attempt to align the trailer hitch components by guessing at the position of the tow vehicle for proper alignment, leave the vehicle to check the closeness of alignment, get back into the tow vehicle to adjust its position, and repeat this procedure until alignment to allow trailer hook-up is achieved. Both of these methods are time consuming, often lead to an increased level of frustration, are very inconvenient in inclement weather and, of course, often a second person to guide the driver with the trailer hook-up is not available. Accordingly, a convenient and effective device to assist the driver in hooking a trailer to a tow vehicle with minimum effort would be very useful.

In searching existing patents to determine the state of the art of devices to assist in hooking a trailer to a tow vehicle, the following patents were found: U.S. Pat. Nos. 3,524,701, 4,163,606, 4,905,376, 4,925,287, and 4,951,913. When compared to the subject invention, all of the above-identified prior patents suffer from significant disadvantages.

U.S. Pat. No. 3,524,701 is directed to a trailer hitch viewing mirror assembly for mounting on a trailer jack post. If this device remains on the trailer jack post after trailer attachment to the tow vehicle, it will interfere with retraction of the jack post. Since the jack post must be retracted before the trailer can be put under tow, the jack post handle must be rotated and/or otherwise moved, which could cause misalignment of the mirror, thereby requiring realignment of the system when the device is subsequently used. Realignment requires the driver of the tow vehicle to leave the vehicle, probably several times, to make the proper adjustments to the viewing device, thereby negating the advantages of having such a device. The driver could have just as easily used the trial and error method for connecting the trailer to the tow vehicle. If the device remains on the jack post while under tow, debris from the tow vehicle and elsewhere will degrade the viewing capability and possibly damage the mirror, thus making subsequent use difficult or impossible. Furthermore, normal road vibration and movement of the trailer and tow vehicle would likely cause misalignment of the system. If the device or portions thereof are removed from the jack post after trailer attachment, significant effort will be required to reinstall items removed., storage of the items will be inconvenient; protective covering for the mirror during storage is not provided, and the system will require realignment before it can be subsequently used with the disadvantages associated with realignment discussed above.

U.S. Pat. No. 4,163,606 is directed to a hitch viewing trailer mirror with snap button connection. Since this device is connected to the front of the trailer, it could interfere with retraction of the jack post in some installations. If the device remains on the trailer while under tow, debris from the tow vehicle and elsewhere will degrade the viewing capability and possibly damage the mirror, thus making subsequent use difficult or impossible. Furthermore, normal road vibration and movement of the trailer and tow vehicle would likely cause misalignment of the system. If the device or portions thereof are removed from the trailer after trailer attachment, significant effort will be required to reinstall items removed; storage of the items will be inconvenient; protective covering for the mirror during storage is not provided; and the system will require realignment before it can be subsequently used. Realignment requires the driver of the tow vehicle to leave the vehicle, probably several times, to make the proper adjustments to the viewing device, thereby negating the advantages of having such a device. The driver could have just as easily used the trial and error method for connecting the trailer to the tow vehicle.

U.S. Pat. No. 4,905,376 is directed to an apparatus for facilitating trailer hitch element alignment. Since this device is mounted to the rear of the tow vehicle, it must be removed after trailer hook-up to provide unrestricted use of the tow vehicle. If the device or portions thereof are removed from the tow vehicle after trailer attachment, significant effort will be required to reinstall items removed., storage of the items will be inconvenient; protective covering for the mirror during storage is not provided, and the system will require realignment before it can be subsequently used. Realignment requires the driver of the tow vehicle to leave the vehicle, probably several times, to make the proper adjustments to the viewing device, thereby negating the advantages of having such a device. The driver could have just as easily used the trial and error method for connecting the trailer to the tow vehicle. If the driver of the tow vehicle elects to leave the device attached to the tow vehicle during tow, the use of the tow vehicle will be restricted, debris from the tow vehicle and elsewhere will degrade the viewing capability and possibly damage the mirror, thus making subsequent use difficult or impossible. Furthermore, normal road vibration and movement of the trailer and tow vehicle would likely cause misalignment of the system, thereby requiring realignment before subsequent use.

U.S. Pat. No. 4,925,287 is directed to a mirror assembly for facilitating trailer hitch element alignment. This device can be attached to either the tow vehicle or the trailer for use. If the device is attached to the tow vehicle, it must be removed after trailer hook-up to provide unrestricted use of the tow vehicle. If the device or portions thereof are removed from the tow vehicle after trailer attachment, significant effort will be required to reinstall items removed; storage of the items will be inconvenient; protective covering for the mirror during storage is not provided; and the system will require realignment before it can be subsequently used. Realignment requires the driver of the tow vehicle to leave the vehicle, probably several times to make the proper adjustments to the viewing device, thereby negating the advantages of having such a device. The driver could have just as easily used the trial and error method for connecting the trailer to the tow vehicle. If the driver of the tow vehicle elects to leave the device attached to the tow vehicle during tow, the use of the tow vehicle will be restricted. Debris from the tow vehicle and elsewhere will degrade the viewing capability and possibly damage the mirror, thus making subsequent use difficult or impossible. Furthermore, normal road vibration and movement of the trailer and tow vehicle would likely cause misalignment of the system, thereby requiring realignment before subsequent use. If the device is attached to the trailer, it could interfere with retraction of the jack post in some installations. If the device remains on the trailer while under tow, debris from the tow vehicle and elsewhere will degrade the viewing capability and possibly damage the mirror, thus making subsequent use difficult or impossible. Furthermore, normal road vibration and movement of the trailer and tow vehicle would likely cause misalignment of the system. If the device or portions thereof are removed from the trailer after trailer attachment, significant effort will be required to reinstall items removed; storage of the items will be inconvenient; protective covering for the mirror during storage is not provided; and the system will require realignment before it can be subsequently used.

U.S. Pat. No. 4,951,913 is directed to a hitch-viewing mirror assembly employing three clamping arms for grasping a pickup truck's tailgate panel. Since this device is mounted to the tailgate of the tow vehicle, it must be removed after trailer hook-up to provide unrestricted use of the pickup truck. If the device or portions thereof are removed from the truck after trailer attachment, significant effort will be required to reinstall items removed; storage of the items will be inconvenient; protective covering for the mirror during storage is not provided; and the system will require realignment before it can be subsequently used. Realignment requires the driver of the tow vehicle to leave the vehicle, probably several times, to make the proper adjustments to the viewing device, thereby negating the advantages of having such a device. The driver could have just as easily used the trial and error method for connecting the trailer to the tow vehicle. If the driver of the truck elects to leave the device attached to the truck during tow, the use of the truck will be restricted, debris from the tow vehicle and elsewhere will degrade the viewing capability and possibly damage the mirror, thus making subsequent use difficult or impossible. Furthermore, normal road vibration and movement of the trailer and tow vehicle would likely cause misalignment of the system, thereby requiring realignment before subsequent use. Also, since this device is designed to mount to the tailgate of a truck, it is restricted to use on trucks as a tow vehicle.

It is therefore the principle object of the present invention to provide a convenient and effective device to assist the driver to hook a trailer to a tow vehicle with minimum effort.

This and other objects are accomplished in accordance with the illustrated embodiment of the present invention by providing a trailer hitch viewing device which attaches to the front of a trailer and allows the driver of the tow vehicle to view the hitch components and bring them into alignment for connection without assistance from others and while remaining in the driver's seat of the tow vehicle looking into the rear view mirror. The device is designed so that, after initial installation, alignment of the mirror and use for a given vehicle/trailer combination, the mirror can be easily detached, without the use of tools or unscrewing nuts or bolts, by merely lifting it out of the anchor bracket. The mirror is designed to be removed after the trailer hook-up has been successfully achieved. After the mirror is removed, it is designed to be folded in the center to form its own protective storage and carrying case. After storage, the mirror can be replaced for subsequent use by merely replacing it in the anchor bracket. Because of the unique design of the anchor bracket, mirror and other mounting hardware, the mirror does not require realignment when replaced. Thus, the device is immediately ready for use as soon as it is placed in the anchor bracket. This device is particularly applicable to horse and cattle trailers or other trailers which have a vertical bulkhead behind the trailer hitch receiver for attachment of the anchor bracket. Furthermore, the design of the mirror and mounting hardware is such that the mirror can also be used as a convenient auxiliary mirror in other locations when not in use for assisting the hook-up of the trailer.

DETAILED DESCRIPTION OF THE INVENTION

Figure 1A:
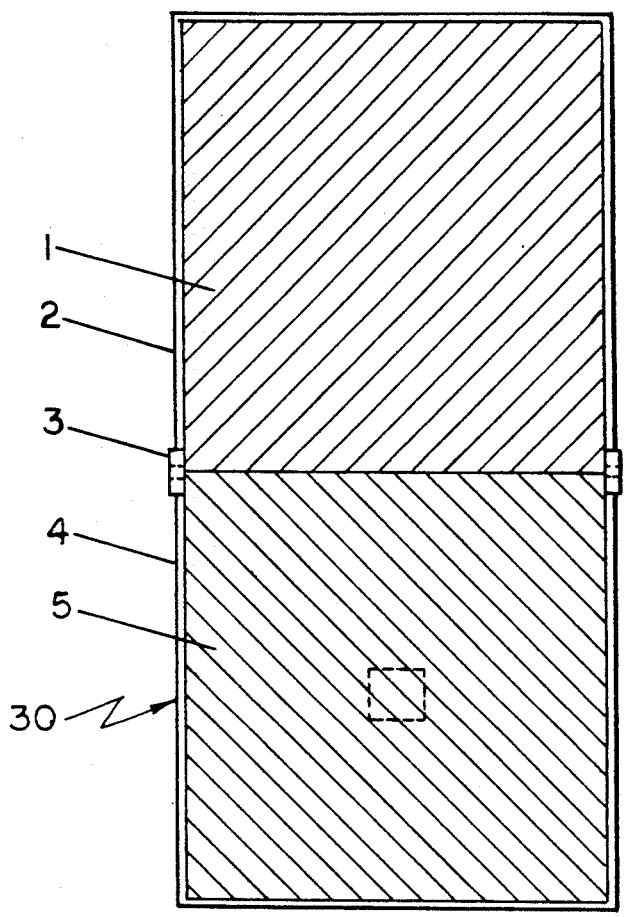
FIG. 1A is a front view of a mirror assembly constructed in accordance with the present invention, the mirror assembly being illustrated in its unfolded position.
Figure 1B:
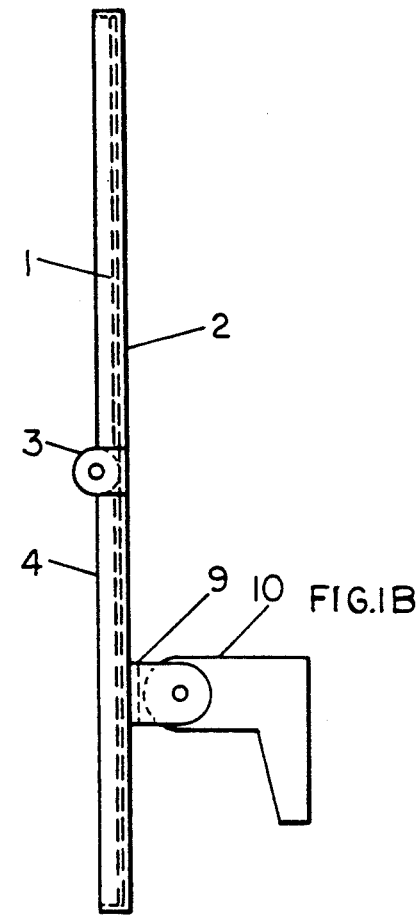
FIG. 1B is a side view of the mirror assembly of FIG. 1A, illustrating mirror tabs attached to a rear surface thereof and a mounting bracket attached to the mirror tabs.
Figure 1C:
FIG. 1C is a side view of an anchor bracket that is attached to a trailer and adapted to receive the mirror assembly of FIGS. 1A and 1B.

Referring now to the drawings, the present invention is a trailer hitch viewing device which attaches to a vertical bulkhead 20 or other vertical member near the front of a trailer 22 and allows the driver of a tow vehicle 24 to view hitch components 26, 28 and bring them into alignment for connection without assistance from others and while remaining in the driver's seat of the tow vehicle 24 and looking into a rear view mirror thereof. The device consists of two main components: a mirror 30 having two halves 1 and 5, each being approximately eight inches square, and folded in the center with a mirror mounting bracket 10 attached to the back, and an anchor bracket 13 for attaching the mirror 30 to the trailer 22. In use, the anchor bracket 13 is permanently attached to a vertical support 20 near the front of the trailer 22 and located so the mirror 30, when mounted and aligned, can be viewed from the rear view mirror in the tow vehicle 24 and can provide a good view of the trailer hitch elements 26, 28, and located also to avoid interference with retraction of a jack post 32 or other trailer operations. After installation of the anchor bracket 13, the mirror 30 is unfolded to the position illustrated in FIG. 1A and fixed in the flat position illustrated by tightening wing nuts 6 on the mirror hinge tabs 3 at the centerline of mirror 30. The mirror mounting bracket 10 is attached to tabs 9 on the back of the mirror 30 with a wing nut 11 and bolt 12, and the free end of the mirror mounting bracket 10 is placed in the anchor bracket 13. The mirror 30 is then aligned by rotating the mirror 30 around the mirror mounting bracket bolt 12 so that the trailer hitch elements 26, 28 may be viewed by the driver of the tow vehicle 24 when in the driver's seat looking into the rear view mirror. Once this alignment is achieved, the wing nut 11 on the mirror mounting bracket bolt 12 on the back of the mirror 30 is tightened so as to securely fix the position of the mirror 30 relative to the mirror mounting bracket 10. The viewing device or mirror 30 is now ready for use.

Figure 2A:
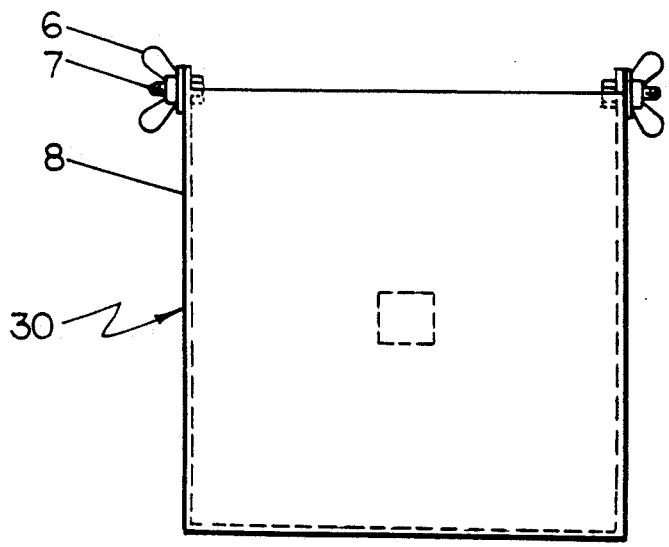
FIG. 2A is a front view of the mirror assembly of FIG. 1A, the mirror assembly being illustrated in its folded position.
Figure 2B:
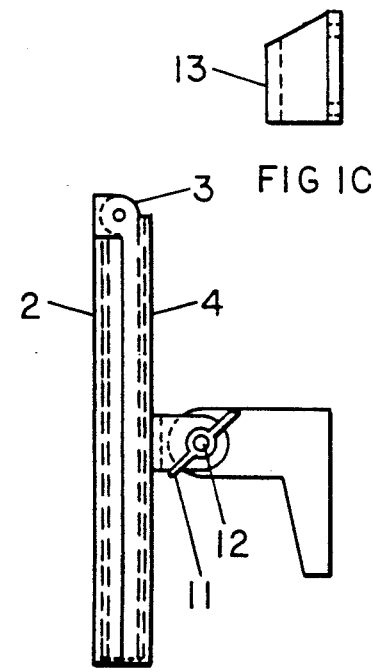
FIG. 2B is a side view of the mirror assembly of FIG. 2A, illustrating the mirror tabs attached to the rear surface thereof and the mounting bracket attached to the mirror tabs.
Figure 3:
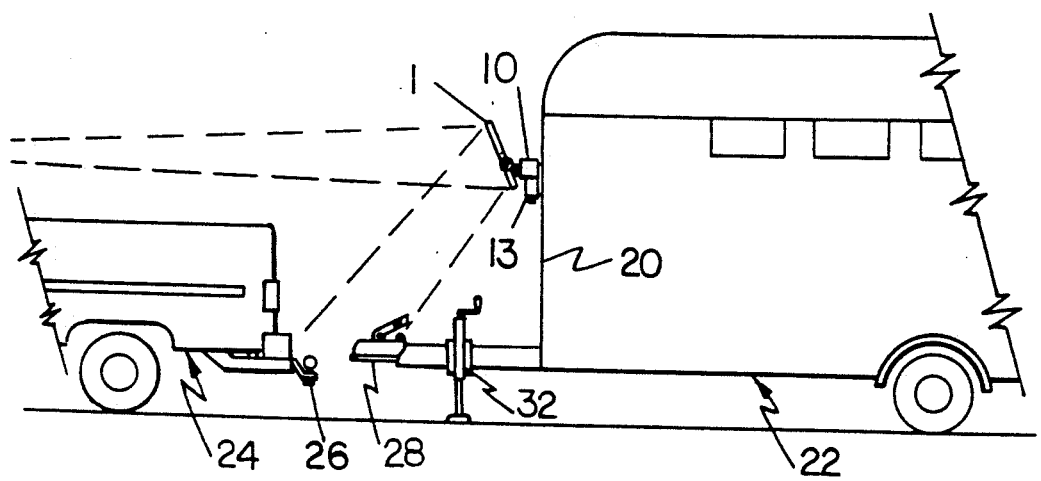
FIG. 3 is a pictorial diagram illustrating a tow vehicle and a trailer having the mirror assembly of the present invention attached thereto and also illustrating the way in which an image of the hitch area of the tow vehicle and trailer is projected for viewing by the driver of the tow vehicle.
Figure 4A:
FIGS. 4A–C are front, top, and side views, respectively, of the mirror tabs of FIGS. 1B and 2B.
Figure 4C:
Figure 5A:
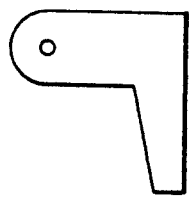
FIGS. 5A–C are side, bottom, and rear views, respectively, of the mounting bracket of FIGS. 1B, 2B, and 3.
Figure 5C:
Figure 4B:
Figure 5B:
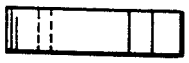
Figure 6A:
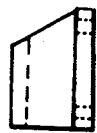
FIGS. 6A–C are side, top, and front views, respectively, of the anchor bracket of FIGS. 1C and 3.
Figure 6C:
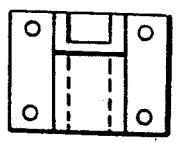
Figure 6B:
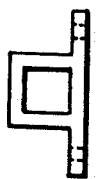

After trailer hook-up is successfully achieved, the driver of the tow vehicle 24 removes the viewing mirror 30 by merely lifting it out of the anchor bracket 13. The wing nuts 6 on the mirror hinge tabs 3 are loosened; the mirror 30 is folded along its centerline to the folded positioned illustrated in FIG. 2A to form a protective storage and carrying case, and the wing nuts 6 are tightened to keep the folding mirror 30 in the folded or closed position.

For subsequent use, the wing nuts 6 are loosened; the mirror 30 is unfolded and fixed in the flat position illustrated in FIG. 1A by tightening the wing nuts 6., and the mirror mounting bracket 10 on the back of the mirror 30 is lowered into the anchor bracket 13.

Note that since the position of the mirror mounting bracket 10 relative to the mirror 30 remains securely fixed, the mirror 30 is already aligned and ready for use when it is replaced in the anchor bracket 13.

After initial installation and alignment, the use of the mirror 30 of the present invention will require the driver of the tow vehicle 2 to leave his vehicle a maximum of two time to achieve trailer hook-up. The first time is required to place the unfolded mirror 30 in the anchor bracket 13 prior to trailer hook-up, and the second time is to remove the mirror 30 from the anchor bracket 13 for storage after successful trailer hook-up.

In summary, the above discussion of prior art hitch viewing devices establishes that these devices suffer from significant disadvantages when compared to the invention described herein. If the existing devices are removed from the trailer and/or tow vehicle after use, then the devices must be realigned for subsequent use. Realignment requires that the driver repeatedly leave the tow vehicle for as many times as it takes to achieve alignment, the number of times being variable depending on the design of the device and weather conditions. If the existing devices are allowed to remain on the trailer and/or tow vehicle during tow, they will be degraded due to road debris. They will likely be damaged and suffer misalignment due to normal road vibrations and tow vehicle and trailer movement. In some case, these prior art devices will restrict the use of the tow vehicle and interfere with retraction of the trailer jack post and/or other trailer operations. Furthermore, if any devices or portions thereof are removed from the trailer and/or tow vehicle, they will be inconvenient to store, and no provisions are made for the protection of the mirror during storage.

In contrast, the present invention is a viewing device which is simple, easy to use, requires only minimum effort on the part of the driver of the tow vehicle, is removed from the trailer during tow to prevent degradation and/or damage, does not require realignment for subsequent use, and provides for convenient storage and protection of the viewing mirror when not in use.

I claim:

1. A mirror assembly removably mounted on a trailer for enabling the driver of a towing vehicle having a hitch ball at its rear to view said hitch ball and a mating hitch of said trailer through a rear view mirror of said towing vehicle so as to be able to maneuver said towing vehicle into position such that said hitch ball is aligned for engagement with said hitch of said trailer, the mirror assembly comprising:

an anchor bracket fixedly mounted to a forward vertical member of said trailer, said anchor bracket being mounted in substantial longitudinal alignment with said hitch of said trailer;

a mirror mounting bracket adapted to be removably engaged with said anchor bracket; and a mirror, said mirror having a planar lower section hingedly attached, on a rear surface thereof, to said mirror mounting bracket such that said lower section may be selectively angularly positioned with respect to a horizontal axis of said mirror mounting bracket and then locked in the selected angular position, said mirror including a planar upper section hingedly attached at an upper edge of said lower section such that said mirror may be folded from an open viewing position in which said upper section is aligned with said lower section in a common plane to a closed storage position in which a reflective surface of said upper section faces a reflective surface of said lower section.

2. A mirror assembly as in claim 1 wherein said mirror includes locking means for locking said mirror in a selected one of said open and closed positions.

3. A mirror assembly as in claim 1 wherein said upper and lower sections of said mirror are of like geometric shape and dimensions.

4. A mirror assembly as in claim 1 wherein said anchor bracket includes a receiving aperture and wherein said mirror mounting bracket includes a mounting post shaped for mating insertion into said receiving aperture of said anchor bracket.

5. A mirror assembly as in claim 4 wherein said mounting post is tapered to prevent motion of said mirror mounting bracket relative to said anchor bracket following insertion of said mounting post into said receiving aperture of said anchor bracket.

* * * * *